United States Patent Office 2,990,138
Patented June 27, 1961

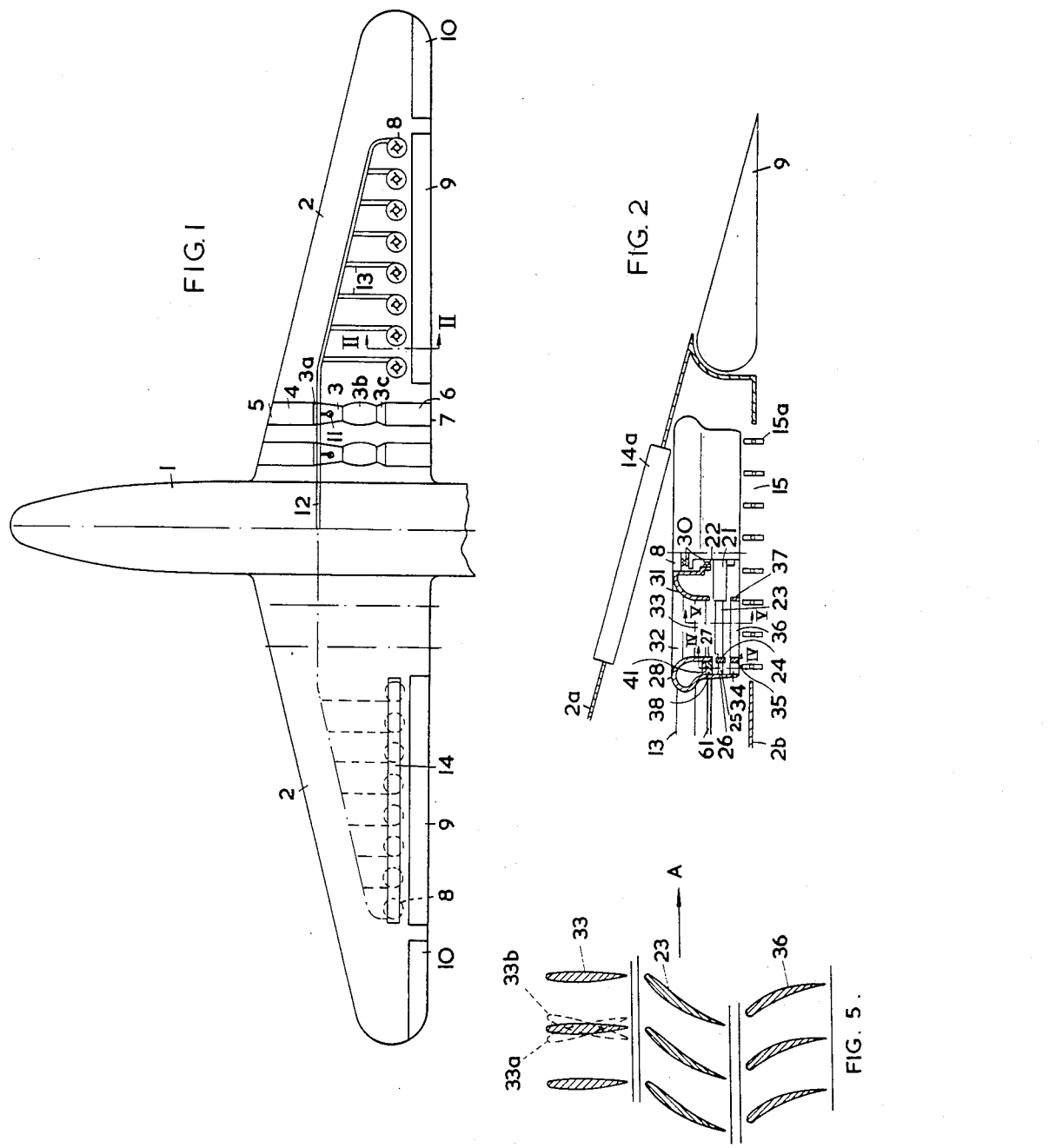

2,990,138
AIRCRAFT WITH TURBINE DRIVEN LIFTING FANS
Ronald Andrew Shaw, Hertfordshire, England, assignor, by mesne assignments, to Power Jets (Research and Development) Limited, London, England, a British company
Filed Oct. 2, 1957, Ser. No. 687,832
Claims priority, application Great Britain Oct. 2, 1956
13 Claims. (Cl. 244—12)

This invention relates to aircraft and particularly though not necessarily exclusively to aircraft designed for very high speed flight. Such aircraft normally have a high wing loading and hence very long landing and take-off runs are necessary. It is an object of the present invention to make provision for increasing the lift on the aircraft on occasion whereby the landing and take-off runs can be curtailed.

According to the invention, an aircraft has a plurality of fans mounted in the wing in a row extending spanwise of the wing towards the trailing edge thereof, the fans being arranged to draw in air and discharge airstreams in a downward direction through the wing lower surface.

Preferably the fans are arranged so that the airstreams discharged therefrom form a sheet extending spanwise of the wing. This sheet acts a "jet flap" which gives rise to a substantial increase in lift on the aircraft; the principle of operation of the jet flap is outlined in a paper published in the Journal of the Royal Aeronautical Society of January 1956 and will not be further discussed here.

The aircraft may have at least one engine arranged to produce thrust to propel the aircraft, and means operable on occasion may be provided to establish a driving connection between the engine and the fans. Each fan may comprise a rotor carrying a row of fan rotor blades and a row of turbine rotor blades in driving connection with the fan blades, the turbine blades being driven, for example, by compressed air bled off from the engine or supplied by an auxiliary compressor driven by the engine.

The invention will be more fully described by way of example with reference to the accompanying diagrammatic drawings of which:

FIGURE 1 is a plan view of an aircraft, the upper surface of one wing being shown as broken away.

FIGURE 2 is a fore-and-aft sectional view through the rear part of one wing of the aircraft, taken on the line II—II in FIGURE 1.

FIGURE 7 is a plan view, similar to that of FIGURE 1, of another aircraft.

FIGURE 8 is a fore-and-aft sectional view of the aircraft of FIGURE 6, taken on the line VII—VII.

Figure 3:
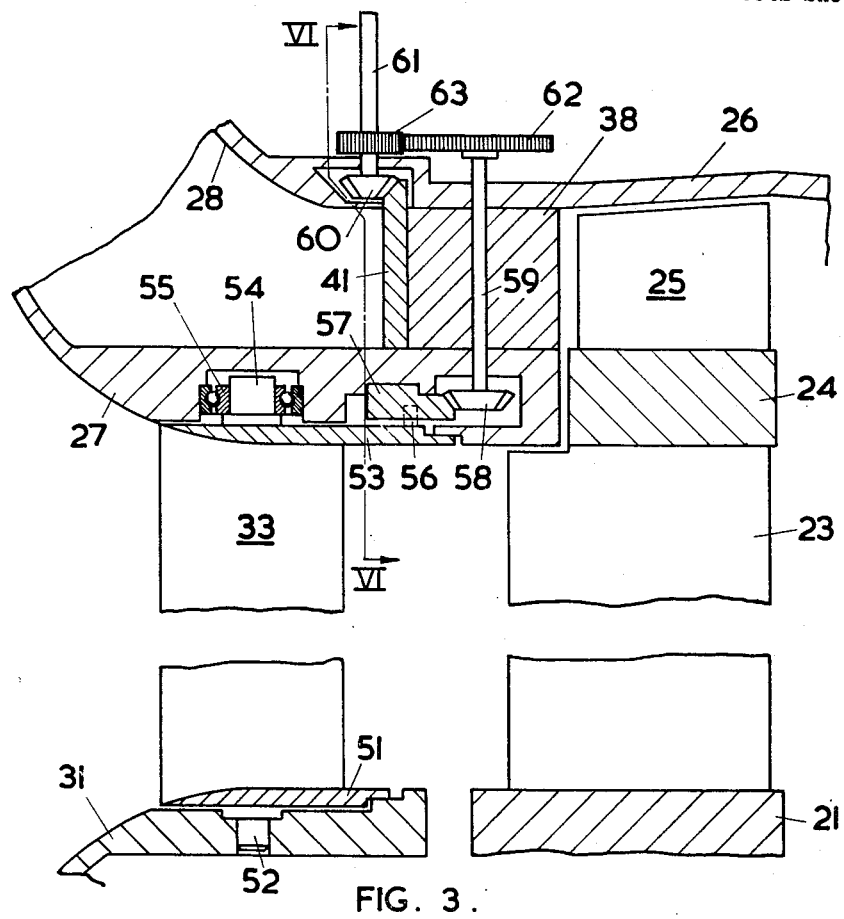
FIGURE 3 is an enlarged sectional view of part of the fan shown in FIGURE 2.

In FIGURE 1, the aircraft comprises a fuselage 1, a pair of wings 2 attached one on each side of the fuselage, and a tail unit (not shown) mounted at the rear of fuselage comprising the usual tailplane and elevators, fin and rudder. It is powered by four gas turbine jet propulsion engines 3 mounted in pairs close to the wing roots. Each engine is of known type comprising a compressor 3a, combustion system 3b, and turbine 3c, and draws in air through an inlet duct 4 connected to an intake 5 in the wing leading edge and discharges a propulsive jet stream rearwardly through a jet pipe 6 terminating in a jet nozzle 7.

Mounted within each wing 2 is a number, in this particular example eight, comparatively small fans 8 arranged with their axes substantially vertical in a row extending spanwise along the wing towards the trailing edge thereof, for example, at about 80% of the wing chord from the leading edge. These fans are described in more detail below. The trailing part of each wing immediately to the rear of the row of fans is formed as a pivoted trailing edge wing flap 9, and the wings are also provided with ailerons 10.

As shown in FIGURE 2, each fan comprises a rotor disc 21 mounted on a shaft 22 and carrying on its periphery a row of axial flow fan rotor blades 23. The tips of the fan blades 23 are connected by a shroud ring 24 which carries on its outer surface a row of axial flow turbine blades 25. The rotor is enclosed by a stator casing 26 which extends upstream and downstream of the rotor. Within this casing on the upstream side of the rotor is an inner annular wall 27 aligned with the shroud ring 24 and defining with the casing an annular nozzle passage leading to the turbine rotor blades 25. The wall 27 and casing 26 are connected at their upstream ends to an annular inlet volute 28.

The rotor shaft 22 is mounted in bearings 30 carried in a fairing 31 on the upstream side of the rotor. This fairing 31 co-operates with the above-mentioned inner wall 27 to define an annular air inlet to the fan rotor blades 23, and is supported from the inner wall 27 by streamline struts 32 extending across the inlet. Also extending across the fan inlet is a row of inlet guide blades 33 lying immediately upstream of the fan rotor blades 23, these blades being angularly adjustable, each being mounted for pivotal movement about a longitudinal radially extending axis.

Mounted on the inner wall of the casing 26 immediately downstream of the turbine rotor blades 25 is a row of inwardly extending turbine stator blades 34, the inner extremities of which are connected by a shroud ring 35 aligned with the shroud ring 24 between the fan and turbine rotor blades. The inner surface of the shroud ring 35 carries a row of inwardly extending fan stator blades 36 lying immediately downstream of the fan rotor blades 23 and connected at their inner extremities by a shroud ring 37 aligned with the surface of the rotor disc 21.

Extending across the annular nozzle passage immediately upstream of the turbine rotor blades 25 is a diaphragm 38 formed with one or more sector shaped openings 39 (see FIGURE 4) provided with flow-directing inlet nozzle vanes 40 and constituting a partial admission nozzle for the turbine. Immediately upstream of the diaphragm 38 is an annular nozzle plate 41 having sector shaped openings 42 corresponding to the nozzle openings in the diaphragm. This plate 41 is circumferentially rotatable so as to cover or uncover part of the turbine nozzle openings and so vary the nozzle area and the mass flow through the turbine.

The turbine rotor blades 25 are of the known impulse type. The blades are symmetrical with respect to a line normal to and bisecting their chord lines, and their inlet and outlet angles are such as to produce a large deflection of the air flowing there-through. The air discharged therefrom thus has a large whirl component. The turbine stator blades 34 are in cross-section similar to conventional compressor blades, and have their trailing edges shaped to discharge the air axially without whirl.

Figure 4:
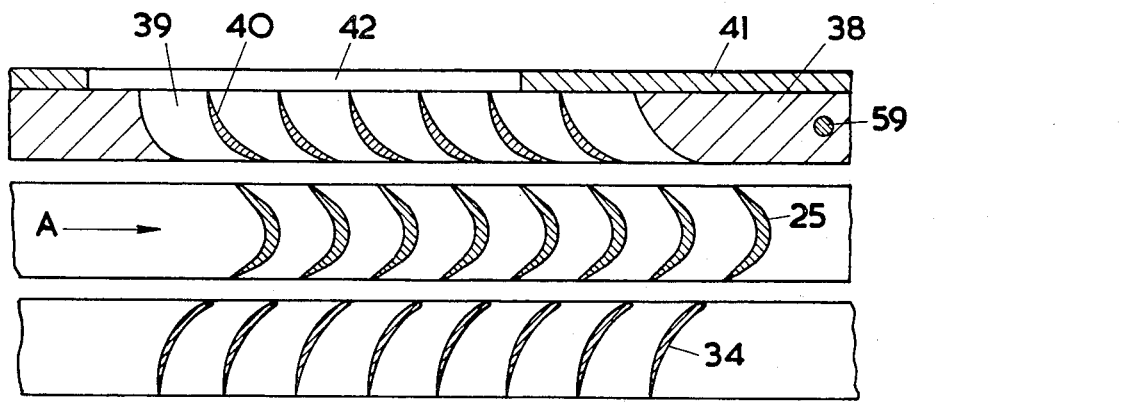
FIGURES 4 and 5 are developed sectional views on the lines IV—IV and V—V in FIGURE 2, showing respectively the turbine and compressor blades of the fan.

The turbine blade angles are such that the peripheral direction of the air at the turbine nozzle outlet and rotor inlet is opposite to that at the rotor outlet and stator inlet as shown in FIGURE 4, the direction of rotation of the rotor being indicated by the arrow A. In order to get the maximum work out of the turbine, the air velocities are quite high, and may be supersonic at the nozzle outlet.

Figure 5:
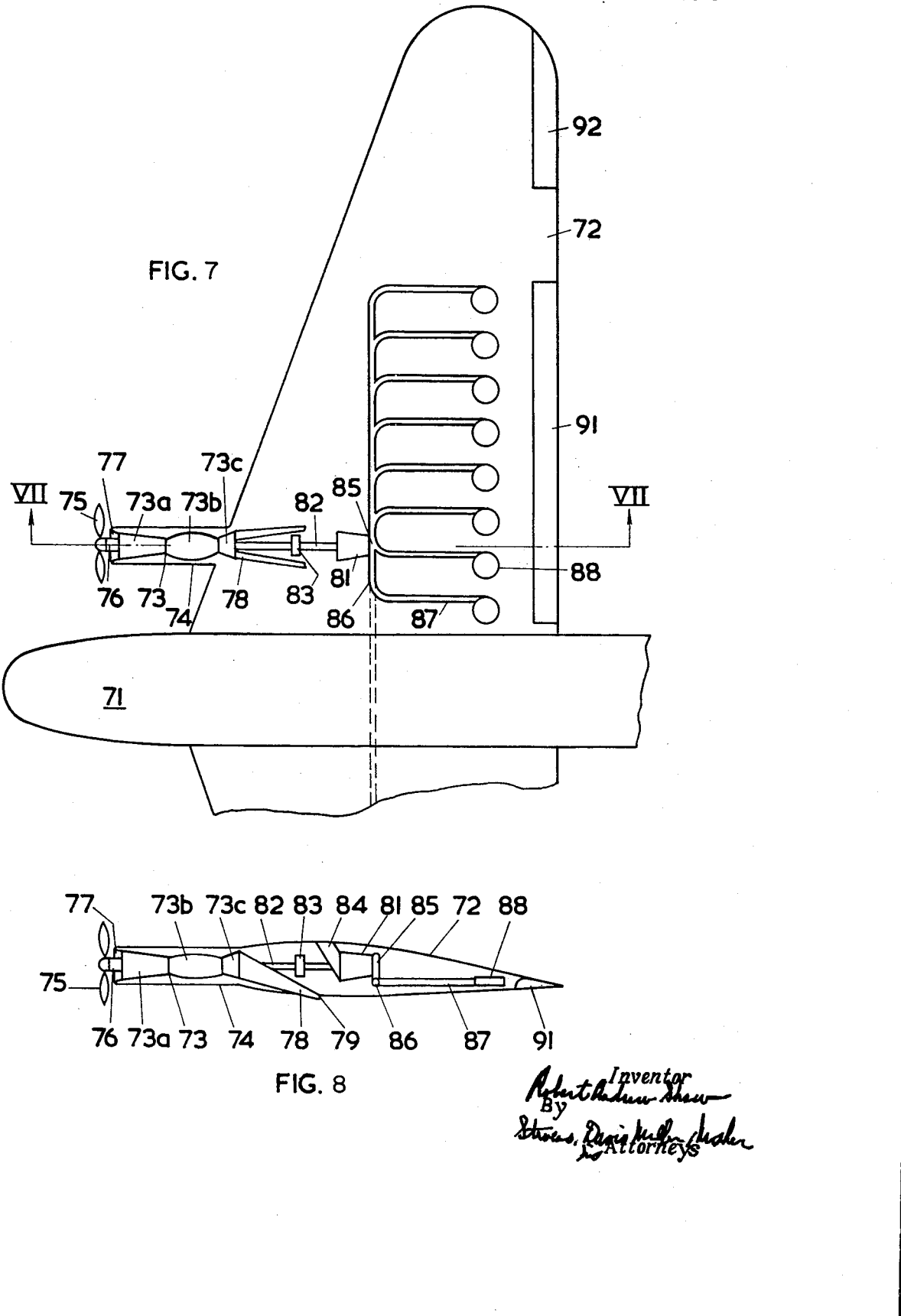

The fan rotor and stator blades 23, 36 are of conventional compressor cross-section, being cambered and oppositely staggered as shown in FIGURE 5. The trailing edges of the stator blades 36 are shaped to discharge the air axially without whirl. The guide blades 33 are uncambered and are angularly adjustable so as to vary the air inlet angle to the fan rotor blades. In this way the rotor velocity can be maintained at a substantially constant value over the range of output of the fan. In the particular embodiment described the guide blade incidence is zero at the design output. For lower outputs the blades are adjusted so that they are staggered oppositely to the rotor blades as indicated at 33a and the outlet air flow has a component in the direction of rotation of the rotor (indicated by the arrow A), and for higher outputs, they are adjusted so that their stagger is in the same sense as the rotor blades as indicated at 33b, and the outlet airflow has a component opposite to the direction of rotation of the rotor. Thus for increasing output, the air outlet angle from the guide blades is decreased from a positive value at minimum output to zero at design output, and then to a negative value for maximum output, the air inlet angle to the rotor blades being correspondingly increased.

Of course in other embodiments of the invention the design incidence of the guide blades may be other than zero.

The adjustable guide blades 33 are linked to the nozzle plate 41 for varying the turbine nozzle area in such a way that when the nozzle area is increased to increase the mass flow through the turbine, and so increase the fan output, the guide blades are adjusted in a sense to maintain the rotor at substantially constant speed, i.e. the air inlet angle to the fan rotor blades is increased. The linkage may be of any conventional form and one arrangement is shown in FIGURE 3.

Each guide blade 33 has an inner shroud 51 and an inner spindle 52 supported in a plain bearing in the fairing 31 and an outer shroud 53 and an outer spindle 54 supported in a ball bearing 55 in the wall 27.

The shroud 53 extends downstream of the blade and has a pin 56 fixed to its outer surface engaging in a recess in an operating ring 57 which is rotatable in a circumferential sense in an inwardly facing groove in the wall 27. The ring 57 is formed with bevel gear teeth which engage with a bevel gear 58 carried within a cavity in the wall 27 on the end of a shaft 59 extending radially through the turbine diaphragm 38. Thus rotation of shaft 59 causes the ring 57 to turn and so the blades 33 can be rotated in unison about radially extending axes.

The nozzle plate 41 for varying the turbine nozzle area extends into a recess in the outer casing 26 and is formed with bevel gear teeth engaging with a bevel gear 60 mounted on a shaft 61. The shafts 59 and 61 are linked by spur gears 62, 63. Thus by turning shaft 61 the plate 41 can be rotated circumferentially and the blades 33 turned about their axes simultaneously, the gear ratio of gears 62 and 63 being chosen to give the desired relation between the movements of the plate and blades to ensure substantially constant rotational speed of the rotor. As the movement of the operating ring 57 will normally be small compared with that of the plate 41, the gear 62 is considerably larger than the gear 63 to give the required speed reduction.

The above described embodiment gives a linear relationship between the angular position of the blades and the turbine nozzle area which may in some cases be satisfactory to produce constant speed conditions over the working range of the fan. In some circumstances some departure from constant speed conditions may be permissible to obviate the necessity for a more complicated linkage. Thus there might be a continuous small variation of speed over the working range of the fan, or the linkage might be such as to give the same rotational speed at minimum, design and maximum outputs while permitting some departure from this value at intermediate outputs.

The fans are driven by compressed air bled off from the compressors 3a of the gas turbine engines 3 of the aircraft. Each compressor has a bleed at or towards its high pressure end connected through a valve 11 to a common manifold 12. Branch pipes 13 from this manifold lead to the volutes 28 of the fans 8.

The upper surface 2a of the wing 2 is formed above the row of fans 8 with a long spanwise extending air intake aperture 14 for the admission of air to the fans, while the lower surface 2b is similarly formed with a long spanwise extending discharge aperture 15. The aperture 14 is provided with pivoted slats 14a extending in a fore-and-aft direction while the aperture 15 is provided with pivoted slats 15a extending in a spanwise direction. These slats can be turned by jacks or like devices (not shown) from a position in which they close off the apertures to one in which they lie edge on to the streams passing therethrough. The slats 15a may also be set in intermediate positions as will be explained below.

The apertures 14, 15 may of course be divided into a number of smaller apertures.

In normal flight conditions, the bleed valves 11 and the apertures 14, 15 are closed and the fans are inoperative. Under conditions when additional lift is required, for example, on landing or take off, the apertures 14, 15 are opened and a proportion of the compressed air from the compressors 3a is bled off and supplied to the fans 8. This air drives the turbine rotor blades 25 which in turn drive the fan rotor blades 23, and each fan accordingly draws in air through the aperture 14 in the upper surface of the wing and discharges an airstream constituted by the air discharged from the fan blades and the air discharged from the turbine blades downwardly through aperture 15. The fans are mounted as close as possible to one another and accordingly together discharge what amounts to a long thin jet sheet extending spanwise along the wing. This sheet acts as a "jet flap" which interacts with the main stream flow over the wing so as to modify the aerodynamic pressure distribution and produce a substantial increase in lift, considerably in excess of the lift resulting from the upward component of jet thrust of the air streams. Thus the landing and take off runs of the aircraft may be curtailed.

At the same time as the fans are set in operation, the flaps 9 may be lowered to their landing or take-off positions as the case may be.

For take-off when maximum lift and minimum drag is required, the engine power is split between the jet stream and the fans. The slats 15a may be set at an intermediate position to direct the air streams in a direction parallel to lower surface of the flap 9 in its lowered position. For landing when maximum lift and maximum drag are required substantially all the engine power may be delivered to the fans, and the slats 15a may be turned to direct the airstreams forwardly with respect to the direction of flight to give braking thrust.

The thrust produced by the fans is varied by turning the shafts 61 which may be connected to common actuator and hence varying the turbine nozzle area and the setting of the fan inlet guide blades 33 of each fan. Since the linkage between the latter is such as to maintain substantially constant rotor speed thrust variation will be practically immediate and the aircraft can thereby be controlled.

Provision may also be made for differential operation of the fans in opposite wings of the aircraft. The shafts 61 of the fans of each wing may be connected to a common actuator, and a control may be provided to operate the actuators in opposite wings differentially, for example, so that in the fans in opposite wings, the turbine nozzle area and the fan inlet guide vane setting are varied in opposite senses, and the thrust produced by the fans in one wing is increased while the thrust produced by the fans in the other wing is reduced. Operation of the fans in this manner will give rise to a rolling moment on the aircraft to supplement or even replace the usual aileron control. In the latter case, if the ailerons 10 are dispensed with, the row of fans may extend substantially the full span of the wing, that is, as nearly as possible from root to tip consistent with structural requirements. In this way, the maximum advantage can be obtained from the "jet flap" effect of the air streams discharged from the fans. In any case it is desirable that the row of fans and hence the sheet of air should extend along a major part of the wing span as shown in FIGURE 1.

In the embodiment described, the flap 9 is relatively small, its chord being, say, 5 to 10% of the total wing chord. In this way it is possible to arrange the fans reasonably close to the wing trailing edge so that the sheet of air can give rise to the jet flap effect. The effect of the flap can be supplemented by turning the slats 15a to direct the sheet in a direction parallel to the flap undersurface. In an alternative arrangement, the wing may have a flap of more usual dimensions, say 20 to 30% of the total wing chord, and the fans may be mounted within the flap itself. Thus when the flap is lowered, the airstreams have a component of motion in a forward direction relative to the direction of flight and give rise to some braking thrust.

Figure 6:
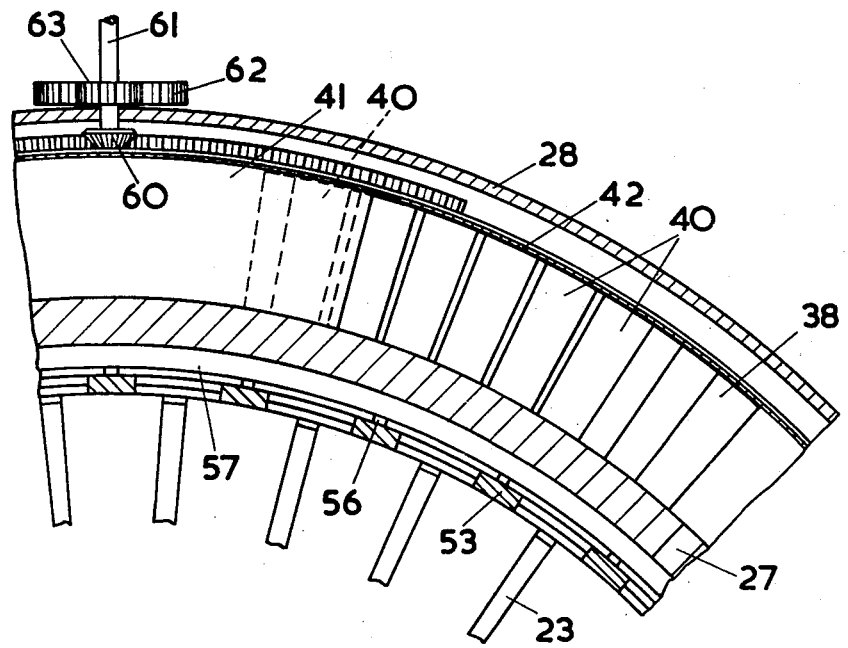
FIGURE 6 is an enlarged section taken on lines VI—VI of FIGURE 3.

In the embodiment of FIGURES 6 and 7, an aircraft has a fuselage 71, a pair of wings 72 and a tail unit (not shown), and is powered by two turbo-prop gas turbine engines 73, one mounted in each wing in a nacelle 74 extending forwardly from the leading edge thereof. Each engine 73 has a compressor 73a, combustion system 73b and turbine 73c. The turbine preferably comprises two mechanically independent rotors, the upstream rotor being connected to drive the rotor of the compressor 73a and the downstream rotor being connected to drive the propeller 75 through a shaft extending coaxially through the combustion system and compressor and a reduction gear 76 in known manner. The engine 73 draws in air through an intake 77 in the front of the nacelle and discharges an exhaust stream through a bifurcated exhaust pipe 78 terminating in exhaust nozzles 79 below the wing.

Mounted within each wing to the rear of and in axial alignment with the engine is an auxiliary axial flow compressor 81. This compressor is drivingly connected to the propeller-driving turbine of the engine through a shaft 82 and a disengagable connection such as a clutch 83. The compressor draws in air through an inlet duct 84 connected to an air intake opening in the upper surface of the wing and discharges into a volute 85. The volute discharges into a manifold 86 common to both compressors 81 which is connected by a number of branch pipes 87 to supply a row of fans 88 which are constructed and arranged in a row extending spanwise along the wing in the same way as the fans 8 of FIGURE 1.

In normal flight the clutches 83 are disconnected and the whole of the power of each engine 73 goes to drive the propeller 75. When increased lift is required, the clutches 83 are engaged and the compressors 81 supply compressed air to the fans which accordingly discharge air streams downwardly, these streams serving to increase the lift on the wings in the manner already described. When the clutches 83 are engaged the propellers may be feathered in known manner or even disconnected from the turbines of the engines so that the greater part or all of the engine power goes to the fans.

As shown in FIGURE 6, each wing is provided with a trailing edge wing flap 91 and aileron 92. The fans draw in and discharge air through apertures in the wing surfaces, which apertures can be closed by slots as in the previously described embodiment.

In either embodiment other forms of driving connection operable on occasion may be provided between the main propulsion engines of the aircraft and the fans. Thus the fan turbines may be driven by exhaust gases bled off from the engines. Alternatively the turbine blading on the fans may be dispensed with and the drive effected mechanically by shafting and clutches or like disengageable driving connection.

I claim:

1. An aircraft comprising a wing formed in its upper surface with an air inlet and in its lower surface with a downwardly facing outlet aperture, said outlet aperture being located towards the trailing edge of the wing and extending spanwise thereof; and a plurality of axial flow fans mounted within the wing in a row extending spanwise thereof and with their axes substantially vertical, the fans being arranged to draw in air through said inlet and to discharge it through said outlet aperture and the fans being so spaced from one another and the outlet aperture being so shaped that the air streams discharged by the fans together form a long thin sheet extending spanwise of the wing.

2. An aircraft according to claim 1 wherein the fans are arranged so that the air sheet extends along a major part of the wing span.

3. An aircraft according to claim 1 having pivoted slats extending in a spanwise sense across the outlet aperture, the slats being pivotable between a position in which they close the aperture and a position in which they lie edge on to the airstreams discharged through the aperture, and means for turning the flaps between said two positions.

4. An aircraft comprising a wing formed in its upper surface with an inlet and in its lower surface with a downwardly facing outlet aperture, said outlet aperture being located towards the trailing edge of the wing and extending spanwise thereof; a plurality of axial flow fans mounted within the wing in a row extending spanwise thereof and with their axes substantially vertical, the fans being arranged to draw in air through said inlet and to discharge it through said outlet aperture and the fans being so spaced from one another and the outlet aperture being so shaped that the airstreams discharged by the fans together form a long thin sheet extending spanwise of the wing; at least one engine so mounted on the aircraft as to produce thrust to propel the aircraft; means operable to establish a driving connection between said engine and said fans; and means for interrupting said connection.

5. An aircraft comprising a wing formed in its upper surface with an inlet and in its lower surface with a downwardly facing outlet aperture, said outlet aperture being located towards the trailing edge of the wing and extending spanwise thereof; a plurality of fans, each comprising a rotor with a row of axial flow fan blades mounted thereon and a row of turbine rotor blades in driving connection with the fan rotor blades, the rotors being mounted within the wing in a row extending spanwise thereof and with their axes substantially vertical, the fans being arranged to draw in air through said inlet and to discharge it through said outlet aperture and the fans being so spaced from one another and the outlet aperture being so shaped that the airstreams discharged from the fans together form a long thin sheet extending spanwise of the wing; at least one engine so mounted on the aircraft as to produce thrust to propel the aircraft; a connection for supplying working fluid from said engine to the turbine blades of each of said fans to drive the latter; and means for opening and closing said connection.

6. An aircraft according to claim 5 wherein the turbine blades of each fan are mounted on the tips of the fan blades.

7. An aircraft according to claim 6 wherein each fan further comprises a variable area turbine nozzle for supplying working fluid to the turbine rotor blades, a further row of fan blades in series flow relationship with the fan rotor blades, the blades of one of the rows of fan blades being angularly adjustable, and means operatively linking said angularly adjustable blades to the variable area turbine nozzle in such a way that, for given conditions of temperature and pressure at the turbine inlet, the rotor speed is maintained at a substantially constant value over the range of output of the fan.

8. An aircraft according to claim 7 wherein the further row of fan blades is a row of angularly adjustable fan inlet guide vanes upstream of the fan rotor blades.

9. An aircraft according to claim 8 wherein the linkage between the inlet guide vanes and the turbine nozzle is such that when the turbine nozzle area is increased, the guide vanes are turned in a sense to increase the fluid inlet angle to the fan rotor blades.

10. An aircraft according to claim 7 wherein the turbine rotor blades are of the impulse type and the turbine nozzle is of the variable area partial admission type.

11. An aircraft comprising a wing formed in its upper surface with an inlet and in its lower surface with a downwardly facing outlet aperture, said outlet aperture being located towards the trailing edge of the wing and extending spanwise thereof; a plurality of fans, each comprising a rotor with a row of axial flow fan blades mounted thereon and a row of turbine rotor blades in driving connection with the fan rotor blades, the rotors being mounted within the wing in a row extending spanwise thereof and with their axes substantially vertical, the fans being arranged to draw in air through said inlet and to discharge it through said outlet aperture and the fans being so spaced from one another and the outlet aperture being so shaped that the airstreams discharged from the fans together form a long thin sheet extending spanwise of the wing; at least one gas turbine engine so mounted on the aircraft as to produce thrust to propel the aircraft, said engine comprising a compressor; a bleed connection for supplying compressed air from said compressor to the turbine blades of each of said fans to drive the latter; and means for opening and closing said connection.

12. An aircraft comprising a wing formed in its upper surface with an inlet and in its lower surface with a downwardly facing outlet aperture, said outlet aperture being located towards the trailing edge of the wing and extending spanwise thereof; a plurality of fans, each comprising a rotor with a row of axial flow fan blades mounted thereon and a row of turbine rotor blades in driving connection with the fan rotor blades, the rotors being mounted within the wing in a row extending spanwise thereof and with their axes substantially vertical, the fans being arranged to draw in air through said inlet and to discharge it through said outlet aperture and the fans being so spaced from one another and the outlet aperture being so shaped that the airstreams discharged from the fans together form a long thin sheet extending spanwise of the wing; a plurality of gas turbine engines so mounted on the aircraft as to produce thrust to propel the aircraft, each engine comprising a compressor; a common manifold; a bleed connection for supplying compressed air from each compressor to said common manifold; means for opening and closing said bleed connections; and branch connections for supplying compressed air from said common manifold to the turbine blades of each of said fans to drive the latter.

13. An aircraft comprising a wing formed in its upper surface with an inlet and in its lower surface with a downwardly facing outlet aperture, said outlet aperture being located towards the trailing edge of the wing and extending spanwise thereof; a plurality of fans, each comprising a rotor with a row of axial flow fan blades mounted thereon and a row of turbine rotor blades in driving connection with the fan rotor blades, the rotors being mounted within the wing in a row extending spanwise thereof and with their axes substantially vertical, the fans being arranged to draw in air through said inlet and to discharge it through said outlet aperture and the fans being so spaced from one another and the outlet aperture being so shaped that the airstreams discharged from the fans together form a long thin sheet extending spanwise of the wing; at least one engine so mounted on the aircraft as to produce thrust to propel the aircraft; an auxiliary compressor; a connection for supplying compressed air from said compressor to the turbine blades of each of said fans to drive the latter; and an engageable and disengageable driving connection between said engine and said compressor.

References Cited in the file of this patent

UNITED STATES PATENTS

| | | |
|---|---|---|
| 1,034,958 | Bernard | Aug. 6, 1912 |
| 1,615,938 | Erickson | Feb. 1, 1927 |
| 1,868,832 | Henter et al. | July 26, 1932 |
| 1,892,460 | Gayman | Dec. 27, 1932 |
| 2,308,477 | James | Jan. 12, 1943 |
| 2,505,660 | Baumann | Apr. 25, 1950 |
| 2,568,812 | Lee | Sept. 25, 1951 |
| 2,589,732 | Riviere | Mar. 18, 1952 |
| 2,692,724 | McLeod | Oct. 26, 1954 |

FOREIGN PATENTS

| | | |
|---|---|---|
| 1,068,404 | France | Feb. 3, 1954 |
| 1,107,179 | France | Aug. 3, 1955 |